(12) United States Patent
Holcomb et al.

(10) Patent No.: US 9,787,481 B2
(45) Date of Patent: Oct. 10, 2017

(54) PHYSICAL UNCLONABLE FUNCTION USING AUGMENTED MEMORY FOR CHALLENGE-RESPONSE HASHING

(71) Applicant: The Regents of The University of Michigan, Ann Arbor, MI (US)

(72) Inventors: Daniel E. Holcomb, Watertown, MA (US); Kevin Fu, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 189 days.

(21) Appl. No.: 14/838,708

(22) Filed: Aug. 28, 2015

(65) Prior Publication Data

US 2016/0065379 A1 Mar. 3, 2016

Related U.S. Application Data

(60) Provisional application No. 62/042,927, filed on Aug. 28, 2014.

(51) Int. Cl.
*H04L 9/32* (2006.01)
*G09C 1/00* (2006.01)

(52) U.S. Cl.
CPC .............. *H04L 9/3278* (2013.01); *G09C 1/00* (2013.01); *H04L 2209/12* (2013.01)

(58) Field of Classification Search
None
See application file for complete search history.

(56) References Cited

U.S. PATENT DOCUMENTS

| 5,694,143 | A * | 12/1997 | Fielder | G09G 5/363 |
| | | | | 345/501 |
| 6,172,925 | B1 * | 1/2001 | Bloker | G11C 7/06 |
| | | | | 365/203 |
| 7,619,932 | B2 * | 11/2009 | Jones | G11C 16/3436 |
| | | | | 365/185.22 |
| 9,406,375 | B1 * | 8/2016 | Barowski | G11C 11/418 |
| 9,436,845 | B2 * | 9/2016 | Iyer | G06F 21/70 |
| 9,497,027 | B2 * | 11/2016 | Chen | H04L 9/3278 |
| 2015/0085566 | A1 * | 3/2015 | Jain | G11C 8/08 |
| | | | | 365/154 |
| 2017/0017808 | A1 * | 1/2017 | Kwong | G06F 21/73 |
| 2017/0038807 | A1 * | 2/2017 | Bittlestone | G06F 1/26 |

\* cited by examiner

*Primary Examiner* — Christopher Revak
(74) *Attorney, Agent, or Firm* — Harness, Dickey & Pierce, P.L.C.

(57) ABSTRACT

A technique is presented for performing a physical unclonable function (PUF) using an array of SRAM cells. The technique can be viewed as an attempt to read multiple cells in a column at the same time, creating contention that is resolved according to process variation. An authentication challenge is issued to the array of SRAM cells by activating two or more wordlines concurrently. The response is simply the value that the SRAM produces from a read operation when the challenge condition is applied. The number of challenges that can be applied the array of SRAM cells grows exponentially with the number of SRAM rows and these challenges can be applied at any time without power cycling.

12 Claims, 9 Drawing Sheets

PHYSICAL UNCLONABLE FUNCTION USING AUGMENTED MEMORY FOR CHALLENGE-RESPONSE HASHING

CROSS-REFERENCE TO RELATED APPLICATIONS

This application claims the benefit of U.S. Provisional Application No. 62/042,927, filed on Aug. 28, 2014. The entire disclosure of the above application is incorporated herein by reference.

GOVERNMENT CLAUSE

This invention was made with government support under grant number CNS-1331652 awarded by the National Science Foundation. The Government has certain rights in this invention.

FIELD

The present disclosure relates to performing a physical unclonable function (PUF) using an array of SRAM cells.

BACKGROUND

An emerging alternative to classical cryptography in embedded systems is the use of physical unclonable functions (PUFs). PUFs use random manufacturing variations constructively, either to generate cryptographic keys, or to implement physical hash functions for challenge-response authentication. The secret key style of PUF is sometimes called a weak PUF, and PUFs capable of challenge-response hashing are sometimes called strong PUFs. The weak versus strong naming convention is adopted for this disclosure, and further clarify that strong PUF here denotes a circuit that natively provides physical challenge-response hashing, to distinguish it from a weak PUF that is used to key a classical hash function to provide the logical equivalent of a strong PUF.

In this disclosure, a technique is presented for performing a physical unclonable function using an array of SRAM cells (also referring to herein as Bitline PUF). This technique leverages the storage cells and support circuitry of SRAM to save area cost, and achieves high throughput by using individual SRAM columns as parallel PUFs instances.

This section provides background information related to the present disclosure which is not necessarily prior art.

SUMMARY

This section provides a general summary of the disclosure, and is not a comprehensive disclosure of its full scope or all of its features.

A method is provided for performing a physical unclonable function using an array of static random-access memory (SRAM) cells. The method includes: providing an array of SRAM cells arranged in rows and columns, where SRAM cells in each row in the array share a common wordline and SRAM cells in each column in the array share common bitlines; issuing an authentication challenge to the array of SRAM cells by activating two or more wordlines concurrently; and detecting, in response to the authentication challenge, an output for each column of the array, where the outputs collectively form a response to the authentication challenge.

More specifically, the method includes: loading values in each SRAM cell in an array of SRAM cells; loading drivers for each wordline in the array of SRAM cells; asserting two or more wordlines concurrently and thereby issue an authentication challenge to the array of SRAM cells; detecting a differential voltage across bitlines associated with each column in the array of SRAM cells; assigning, for each differential voltage, a value to a binary number based on the differential voltage; and aggregating the value of the binary number from each column in the array of SRAM cells to form an output.

In another aspect of this disclosure, a system is provided for performing a physical unclonable function. The system includes: an array of SRAM cells arranged in rows and columns, where the SRAM cells in each row in the array of SRAM cells share a common wordline and the SRAM cells in each column in the array of SRAM cells share common bitlines; a plurality of wordline control circuits, such that each wordline control circuit is electrically coupled to a different one of the common wordlines associated with a given row in the array of SRAM cells and is configured, in response to a trigger signal, to activate the respective common wordline; and a controller electrically connected to each of the plurality of wordline control circuits and operates to issue a trigger signal to two or more wordline control circuits concurrently.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
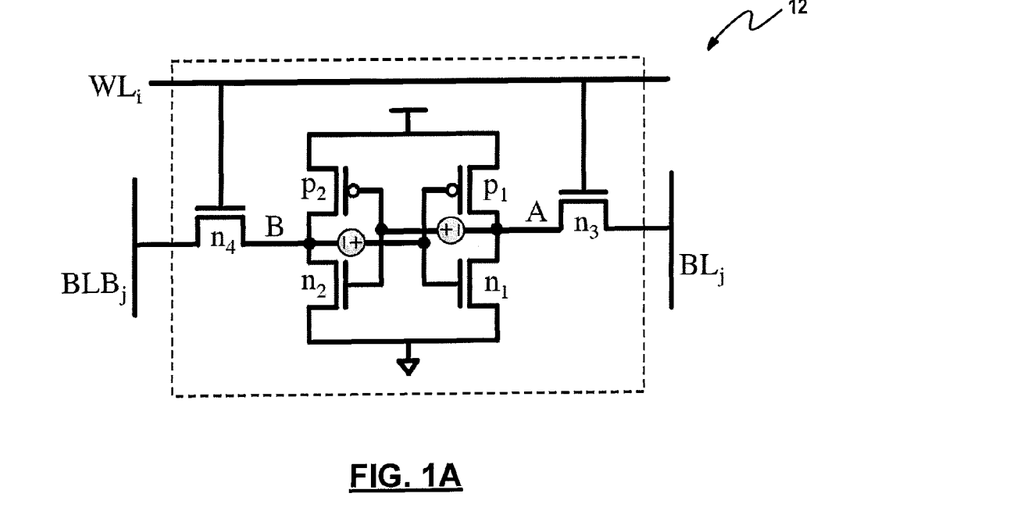
FIG. 1A is a schematic of an example SRAM cell.

Static Random-Access Memory (SRAM) is a ubiquitous building block of integrated circuits that is found in caches, register files, and buffers. Single VLSI circuits commonly contain millions of bits of SRAM storage. Each bit of SRAM is typically implemented by a pair of inverters cross coupled to each other. More specifically, an example single 6-transistor cell 12 as seen in FIG. 1A. In this arrangement, each SRAM cell has two stable states. In each stable state node A or B is pulled high through transistor $p_1$ or $p_2$ while the other is pulled low through $n_1$ or $n_2$. The cell is read and written using complementary bitlines (BL) and (BLB) through two access transistors $n_3$ and $n_4$. The two access transistors of a cell are controlled by a single wordline. While reference is made to a six transistor cell, other circuit arrangements for a SRAM cell are also contemplated by this disclosure.

Figure 1B:
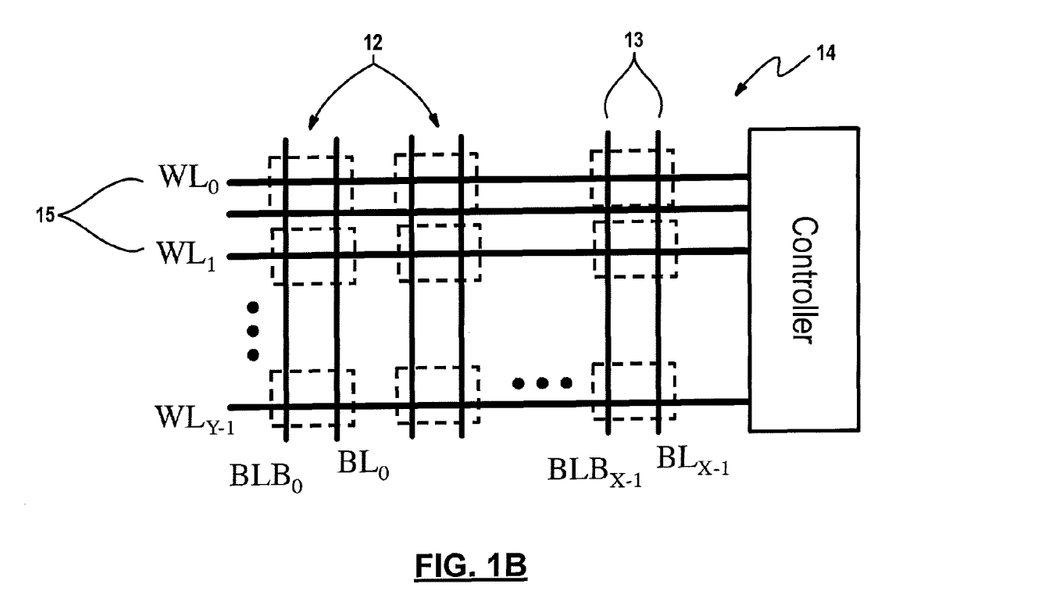
FIG. 1B is a schematic of an array of SRAM cells.

Referring to FIG. 1B, the SRAM cells 12 in a memory are arranged in an array (or matrix) of rows and columns 14. SRAM cells 12 in the same column share common bitlines 13 and hence only one cell per column is accessed at any time. SRAM cells in the same row share a wordline 15 but have independent bitlines and are therefore read and written in parallel as data words. Each SRAM column uses support circuitry to read and write its cells. A cell is written by setting one bitline high and the other low and then asserting the wordline to transfer the bitline values to the cell. A microcontroller or other type of processor is electrically connected to each of the wordlines and operates to issues a trigger signal to two or more of the wordline control circuits as will be further described below.

Figure 1C:
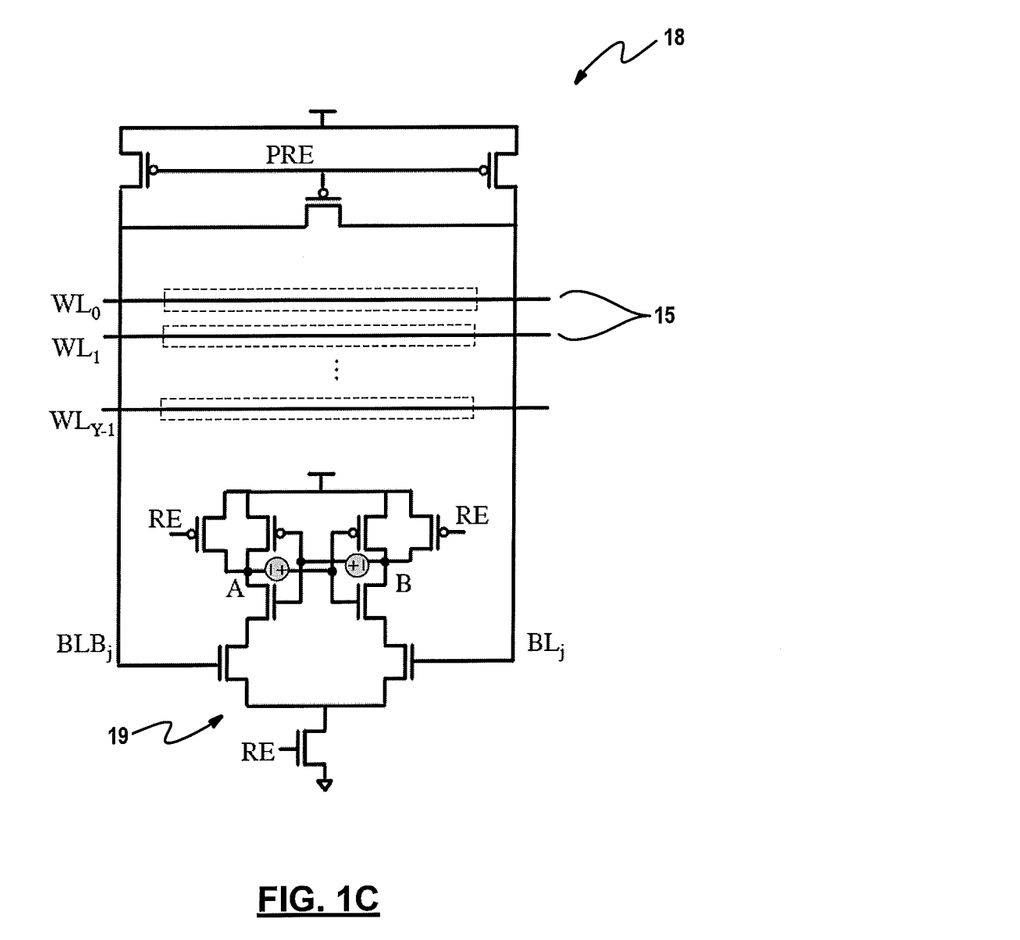
FIG. 1C is a schematic of precharge circuit and sense amplifier for use with an SRAM column.

FIG. 1C further depicts one column in the proposed system for performing a physical unclonable function. An evaluation of the proposed system is similar to an SRAM read operation, and hence a detailed explanation of the SRAM read operation is given here as background. The support circuitry for a read operation comprises precharge logic 18 at the top of each column and a sense amplifier 19 at the bottom of each column. In an example embodiment, the sense amplifier 19 detects the voltage difference across the bitlines at a specified time after the appropriate wordlines are activated, and from this potential difference produces a full-swing digital 1 on either node A or B of the sense amplifier and produces the complementary value on the other node. This digital value is read out via the SRAM output port. Other types of amplifier circuits also fall within the scope of this disclosure.

Figure 2A:
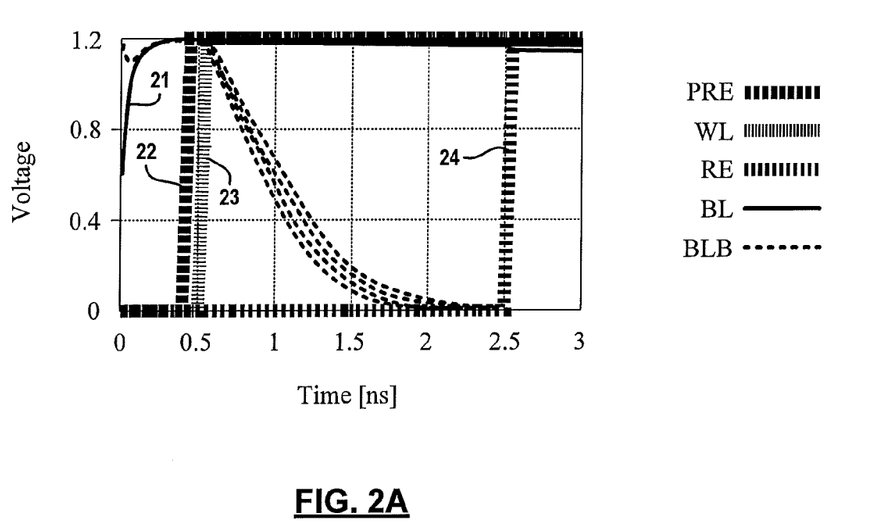
FIGS. 2A and 2B are graphs depicting an SRAM read operation and a bitline PUF evaluation.

FIG. 2a shows the timing of the control signals (PRE, WL, and RE) for a read operation and shows overlaid bitline waveforms from reading cells with different process variations. During an SRAM read operation, both bitlines are first charged at 21 and equalized by the precharge circuit 21 at the top of the column. Next, the precharge signal (PRE) goes high at 22 to end the precharge phase and the wordline (WL) for a single row is asserted at 23. The wordline connects a cell to the precharged bitlines and depending on the state of the cell, transistor $n_1$ or $n_2$ will begin to discharge one of the bitlines through the corresponding access transistor. The discharge rate of the bitline varies depending on the random variation of the transistor that is discharging it. A fixed time after the wordline is asserted, a read-enable signal (RE) is asserted at 24 to activate the sense amplifier. The sense amplifier detects the difference in voltage across the two bitlines and generates from it a digital 0 or 1 value. The digital value in the sense amplifier is the final result of the SRAM read operation, and can be sent out of the SRAM.

Figure 3:
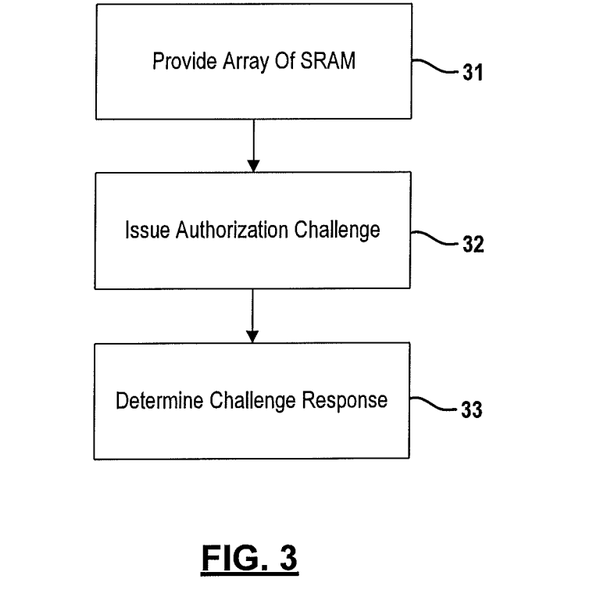
FIG. 3 is a flowchart depicting an overview of the proposed technique for performing a physical unclonable function.

FIG. 3 provides an overview of the proposed technique for performing a physical unclonable function (PUF) using an array of SRAM cells. The array of SRAM cells 14 serves as the starting basis as indicated at 31. The array of SRAM cells 14 are preferably arranged in row and columns, where the SRAM cells in each row in the array share a common wordline and the SRAM cells in each column share common bitlines.

The technique can be viewed as an attempt to read multiple cells in a column at the same time, creating contention that is resolved according to process variation. An authentication challenge is issued to the array of SRAM cells at 32 by activating two or more wordlines concurrently. More specifically, a challenge is applied to the array of SRAM cells 14 by pre-loading chosen values into the SRAM cells, and choosing the wordlines to concurrently activate. The PUF response is simply the value that the SRAM produces from a read operation when the challenge condition is applied. Thus, in response to the challenge, an output is detected at 33 for each column of the array, such that the outputs collectively form a response to the authentication challenge. In an example implementation, the response to the authentication challenge is compared to a previous challenge of the same array. When the responses match, the challenge is deemed to be authenticated and thus a requested function may be performed by the computing device. On the other hand, the challenge is not authenticated when the responses are mismatched. This technique for performing a physical unclonable function may also serve as the basis for other types of computing functions.

The array of SRAM cells 14 requires additional circuitry to enable the concurrent activation of multiple wordlines because the capability of activating multiple wordlines has no use in SRAM's traditional tasks of reading, writing, and storing data. While a particular type of PUF response is described herein, the PUF can be view more broadly as causing electrical contention across different memory cells. The accumulator circuit is a way of causing this contention in one embodiment, but even if the SRAM architecture changes in the future, different ways of modifying the architecture to cause contention are envisioned.

This technique is further described as follows. Let the challenge applied to an array be C: $\{c_0, c_1, \ldots, c_{Y-1}\}$, where Y is the number of rows in the array of SRAM cells. Each element $c_i$ of the challenge corresponds to SRAM row i as follows, and say that any row is active in a challenge if its corresponding challenge element ($c_i$) is either 0 or 1. For example, if $c_i=0$, then row i is loaded with 0s and $WL_i$ is on during evaluation.

if $c_i=1$, then row i is loaded with 1 s and $WL_i$ is on during evaluation.

if $c_i=2$, then row i is loaded with 0s and $WL_i$ is off during evaluation if $c_i=3$, then row i is loaded with 1 s and $WL_i$ is off during evaluation A single SRAM column constitutes a Bitline PUF with a 1-bit response, and Bitline PUFs are therefore inherently parallel because a challenge is applied concurrently to many SRAM columns. Let a 1-bit PUF at column i be denoted $P_i$, and its response to challenge C be denoted $P_i$ (C). Let an X-column Bitline PUF be denoted $P_{0:X-1}$ and its response be $P_{0:X-1}$ (C)={$P_0$ (C), $P_1$ (C), $P_{X-1}$ (C)}. Note that for simplicity of description the same challenge is applied to all columns of the SRAM PUF. Different challenges can be applied to different columns provided that the challenges agree on which rows are active. This can be particularly useful in the case of inactive rows that retain pre-existing data through a challenge. Therefore, a Bitline PUF with Y rows and X columns has $4^Y$ possible challenges and $2^X$ possible responses.

Figure 4:
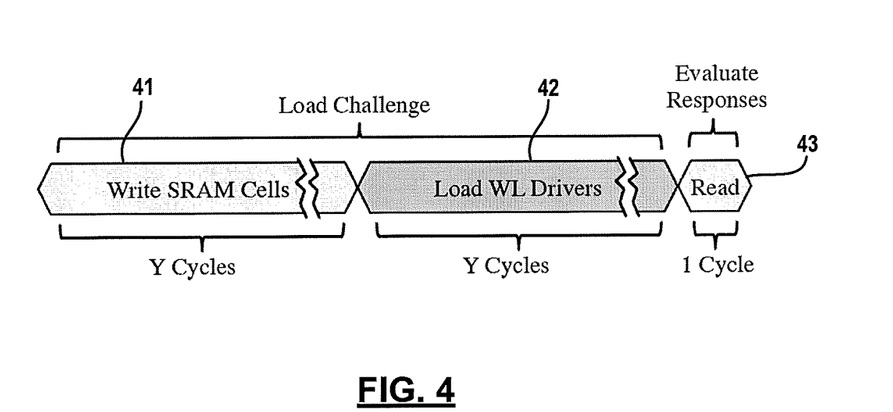
FIG. 4 is a diagram illustrating a sequence of operations for evaluating the PUF response to a challenge.

The sequence of events necessary to implement the challenge technique is shown in FIG. 4. The first two phases 41, 42 set up the desired challenge by loading values into SRAM cells and enabling the appropriate wordlines. The final phase 43 evaluates the PUF response by reading the value produced when the challenge is applied. The Bitline PUF evaluation is destructive with respect to active rows only. It is therefore possible to use only some rows of SRAM as part of a Bitline PUF evaluation while others rows are being used as storage or different challenges. Each of these phases of operation are further described in the following paragraphs.

Figure 5:
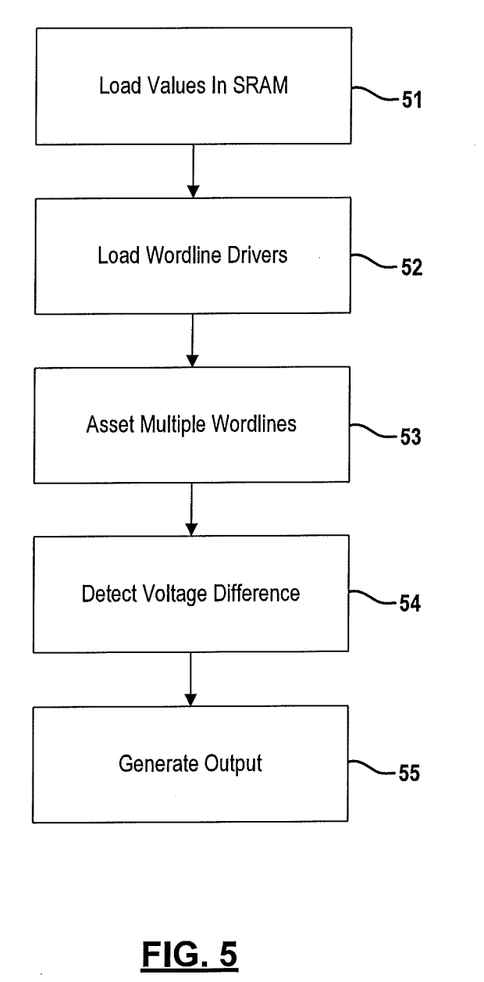
FIG. 5 is a flowchart depicting the sequence of steps for evaluating the PUF response to a challenge.

With reference to FIG. 5, values are loaded at 51 into each SRAM cell. The values loaded into the SRAM cells of active rows will determine which transistors will ultimately be used to discharge the bitlines during the evaluation of the PUF response. To load a specific challenge, the cells of each row i are written with the value specified by $c_i$. The SRAM cells, as in other write operations, are written one row at a time, so the time to write all Y rows is Y cycles as indicated in FIG. 4. Y cycles is an upper bound that assumes all rows will be used in the challenge; depending on the desired challenge, the time may be less than Y cycles.

At the start of the second phase 42, the accumulator of every wordline is reset. In each of the subsequent Y or fewer cycles, a $\log_2$ (Y)-bit select signal sets high the flip-flop of one active wordline as indicated at 52. Once all flip-flops are appropriately loaded, an evaluation signal passes the loaded values to the wordline drivers, so that multiple wordlines are asserted in the same cycle during the PUF evaluation.

Figure 6:
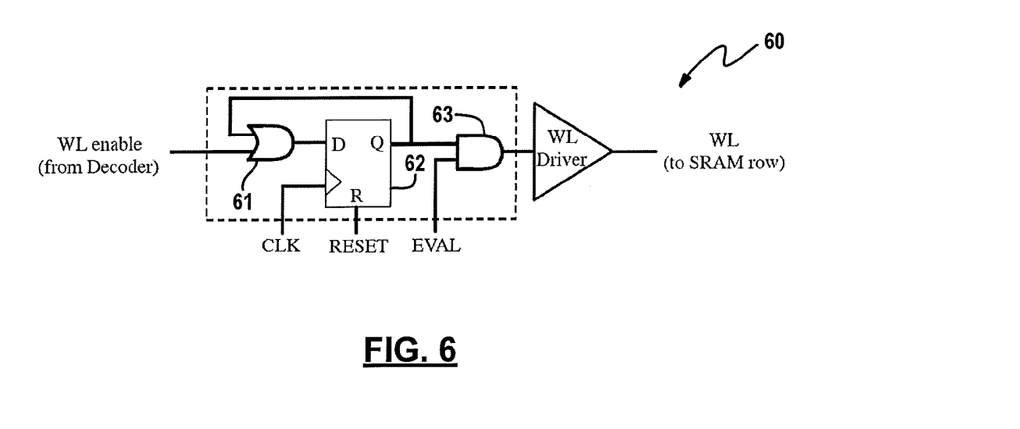
FIG. 6 is a schematic of an example wordline accumulator circuit that enables sequential loading and concurrent activation of wordlines.

The proposed technique requires augmentation to the wordline control circuitry so that multiple wordlines can be concurrently enabled during PUF evaluation. In a typical SRAM, an externally supplied $\log_2$ (Y)-bit address is decoded to select exactly one of the Y rows for reading; the selected row then uses a clocked driver to set its wordline high at the appropriate time during the clock cycle. The proposed PUF technique requires multiple wordlines to be concurrently enabled, and this can be accomplished by having a flip-flop that accumulates wordline activation signals at the input of each wordline driver. An example wordline control circuit 60 is shown in FIG. 6. The wordline control circuit 60 is comprised of an OR gate 61, a flip-flop 62 and an AND gate 63. Other circuit arrangements for the wordline control circuit are also contemplated by this disclosure.

Figure 2B:
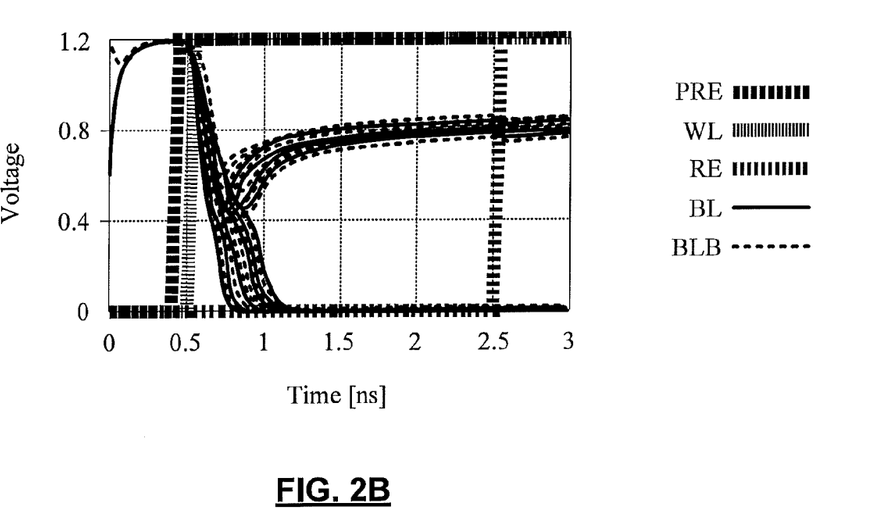

Evaluating the PUF response is identical to an SRAM read operation, except that multiple wordlines are asserted. For each column, the cells at any active row will discharge one of the two complementary bitlines, and considering that different cells in the column will discharge each bitline, this causes both bitlines of a column to be discharged during the evaluation. The discharging of bitlines for a variety of challenges are shown in FIG. 2B. While both bitlines initially discharge, there is no stable state in which both bitlines are fully discharged due to the cross-coupled inverters in the active SRAM cells. Contention thus ensues until a stable state is reached with one bitline charged and the other fully discharged. Note that the charged bitline in the stable state does not charge all the way to $V_{dd}$, but only charges to $V_{dd}-V_{th}$ because it is being pulled high by SRAM cells through an NMOS access transistor that causes a voltage drop of $V_{th}$. If the bitlines reach a stable state in the time between the assertion of the wordline and the assertion of the read enable (RE) signal, then an output can be detected. More specifically, a sense amplifier unambiguously detects the large differential voltage of $\pm(V_{dd}-V_{th})$ across the bitlines at 54, and generates a digital output at 55 as in a normal SRAM read operation. In an example embodiment, the differential voltage is assigned as either a 0 or 1. Assigned values from each column in the array is then aggregated to form the output. This output is the response to the applied challenge.

The three phases of operation as seen in FIG. 4 define its latency and throughput. All cells are written in Y cycles, all wordline accumulators are loaded in Y additional cycles, and all X columns are evaluated in parallel during a single cycle. Therefore, the latency to obtain an X-bit response is 2Y+1 cycles and the response throughput is $$\frac{X}{2y+1}.$$

For a 256-column by 256-row SRAM with a 5 ns cycle time, this corresponds to a latency of 2.6 µs and a response throughput of 99.8 Mbps.

The results in this disclosure are obtained from circuit simulation using the Ngspice simulator (Rev 25). On account of the long runtimes of large SPICE simulations, the columns of the simulated bitline PUFs have only 16 rows, whereas a real SRAM would typically have hundreds of rows.

Transistor and interconnect models used to validate the design are from the freely-available Predictive Technology Model (PTM). More specifically, the transistor models are BSIM4 PTM models for a 90 nm process. Transistor sizes are shown in Table 1 below.

TABLE 1

|  |  | Sizing | | Process Variation | | | |
|---|---|---|---|---|---|---|---|
|  |  |  |  | vth0 [mV] | | lint [nm] | |
|  |  | W [nm] | L [nm] | µ | σ | µ | σ |
| SRAM CELL | n1, n2 | 200 | 90 | 397 | 13.4 | 7.5 | 3 |
|  | n3, n4 | 140 | 90 | 397 | 16.0 | 7.5 | 3 |
|  | p1, p2 | 140 | 90 | −339 | 16.0 | 7.5 | 3 |
| Sense Amp & Percentage | NMOS | 1000 | 90 | 397 | 6.0 | 7.5 | 3 |
|  | PMOS | 1000 | 90 | −339 | 6.0 | 7.5 | 3 |

To better represent a real design, the 16 SRAM rows simulated are modeled as being distributed over a typical-length bitline. In this way, the 16 rows can be considered as existing among many others within a realistic-sized SRAM. Assume for bitline modeling an SRAM with 520 rows and a cell height of 0.72 µm, for a total length of 374.4 µm per bitline. According to the PTM interconnect calculator, a 374.4 µm local interconnect in 90 nm technology has a total resistance of 183.04Ω and capacitance of 69.67 fC. The resistance and capacitance is distributed such that the bitlines between each pair of adjacent rows is implemented by a wire model with an 11.44Ω resistance between two capacitors of 2.17 fC each.

To model process variations from fabrication, random parameter variation is applied to every transistor of each PUF instance. The transistor parameters determining threshold voltage and length are replaced by normally distributed N ($\mu$, $\sigma^2$) random variables. Table 1 shows the mean and standard deviation for each such parameter.

Random dopant fluctuation is represented in transistor parameter vth0. The mean value for threshold voltage is the default value in the transistor model, and the standard deviation depends on transistor geometry according to Eq. 1; larger devices have less threshold variation than the small devices in the SRAM cells. We use a value of 1.8 mV µm for $A_{VT}$.

$$\sigma_{VT} = \frac{A_{VT}}{\sqrt{WL}} \quad (1)$$

Variations in effective transistor length are represented by changes to parameter lint. Lint, standing for internal length, represents the difference between nominal and effective transistor length. The nominal value of lint is 7.5 nm and its standard deviation is set to 3 nm based on the observation that effective transistor length has a 3σ value that is 10% of overall transistor length.

Thermal noise is modeled in SPICE by transient random voltage sources. As represented by small grey circles in FIG. 1A and FIG. 1C, noise sources are added between the cross-coupled state nodes of SRAM cells and sense amplifiers. The magnitude of thermal noise at each node depends on the node capacitance (Eq. 2). The standard deviation of noise for each SRAM cell node is set to 4.5 mV, and for each sense amplifier node is 1.7 mV³.

$$\sigma_{NOISE} = \sqrt{\frac{k_B T}{C}} \quad (2)$$

The simulation methodology explained in the previous section is used for experimental evaluation of the Bitline PUF. Uniqueness of responses, and reliability with respect to temperature and supply voltage variation are evaluated. Finally, power consumption and susceptibility to modeling attacks are considered. These experimental results indicate that the Bitline PUF is promising as a reliable and unique strong PUF.

The mixture of $c_i$ values in each challenge can bias PUFs toward producing 0-responses or 1-responses, but ideal challenges should produce either response with equal probability across a population. From a circuit perspective, ideal challenges should discharge both bitlines with equal strength to increase the sensitivity of response to process variations. For a symmetric SRAM cell, where only variation differentiates $n_1$ and $p_1$ from $n_2$ and $p_2$, the two complementary bitlines discharge with equal strength when the same number of NMOS transistors (i.e, $n_1$ or $n_2$ of each active cell) are discharging each one. The challenges that cause this situation are those having an equal number of $c_i=0$ and $c_i=1$ values, along with some unspecified mixture of inactive rows with $c_i=2$ or $c_i=3$; challenges satisfying this condition are therefore denoted as "unbiased".

Figure 7A:
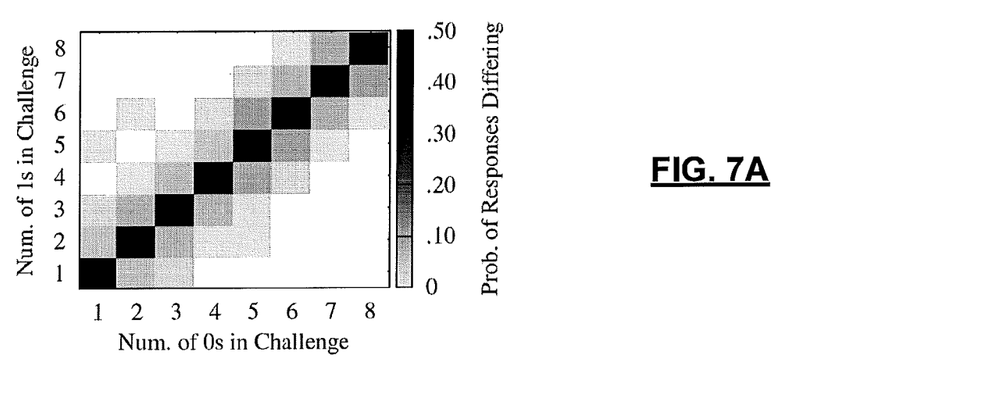
FIG. 7A is a graph illustrating challenges with an equal number of zero and one values are highly likely to produce different responses on different chips; these challenges are the most sensitive to process variations and therefore most useful among all possible challenges.

The heat map of FIG. 7A confirms that unbiased challenges are the ones most likely to elicit different responses from different PUF instances. For each of the 64 squares in the plot, 1000 randomly generated challenges with the specified number of 0s and 1s are created. Each of the challenges is applied to two randomly selected PUF instances to check whether the responses differ. For the unbiased challenges, along the diagonal of FIG. 7A, the responses of the two PUFs differ in roughly half of all trials. For challenges that are slightly biased (i.e. close to the diagonal), the PUFs sometimes produce differing responses. For challenges that are highly biased (e.g. at the upper left and bottom right corners of FIG. 5a), all PUF instances produce the same response.

Figure 7B:
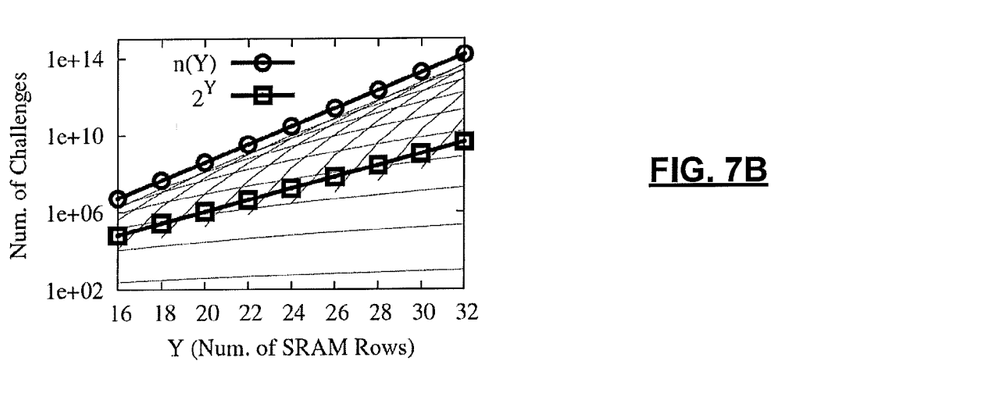
FIG. 7B is a graph illustrating the number of unbiased challenges is exponential in the number of SRAM rows.

The number of unbiased challenges having exactly k challenge values with $c_i=0$ and k with $c_i=1$ is given by $n'_k(Y)$ (Eq. 3). The number of total unbiased challenges with any number of $c_i=0$ and $c_i=1$ values is given by $n(Y)$ (Eq. 4). The number of unbiased challenges is exponential in the number of rows Y (i.e. the challenge size). Therefore, an adversary cannot hope to mimic a PUF by simply recording all challenge-response pairs, and must instead resort to predicting responses using a parametric model.

$$n'_k(Y) = \binom{Y}{k} * \binom{Y-k}{k} \quad (3)$$

$$n(Y) = \sum_{k=1 \ldots \frac{Y}{2}} n'_k(Y) \quad (4)$$

A single PUF should always respond to the same challenge similarly, and two PUF instances should never respond to the same unbiased challenges similarly. For a challenge C, a comparison of two responses from the same PUF is denoted "within-class", and a comparison of responses from two different PUFs is denoted "between-class." Hamming distance (Eq. 5) is used to quantify the similarity of responses in each between-class or within-class comparison. Within-class distances are a measure of unreliability, and between-class distances are a measure of uniqueness.

Figure 8:
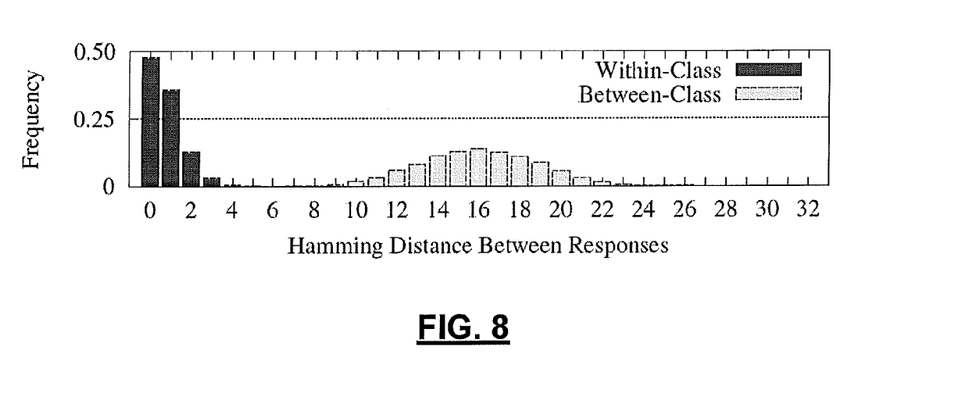
FIG. 8 is a graph illustrating the Hamming distances between responses.

Within-class and between-class Hamming distances are evaluated experimentally on 32-column bitline PUFs. For each of 200 random unbiased challenges, 5 PUF instances are generated and the challenge is applied 6 times to each. Within-class distances are obtained by comparing the responses of the same PUF to the same challenge, and between-class distances are obtained by comparing the response of different PUFs to the same challenge. The separability of within-class and between-class Hamming distances (FIG. 8) implies that responses are unique across Bitline PUF instances. The average within-class Hamming distance is 0.75 for a 32-bit response, and the average between-class distance is 16.01.

$$HD(P_{0:X-1}, P'_{0:X-1}, C) = \Sigma_{i=0 \ldots X-1} P_i(C) \oplus p'_i(C) \quad (5)$$

Figure 9A:
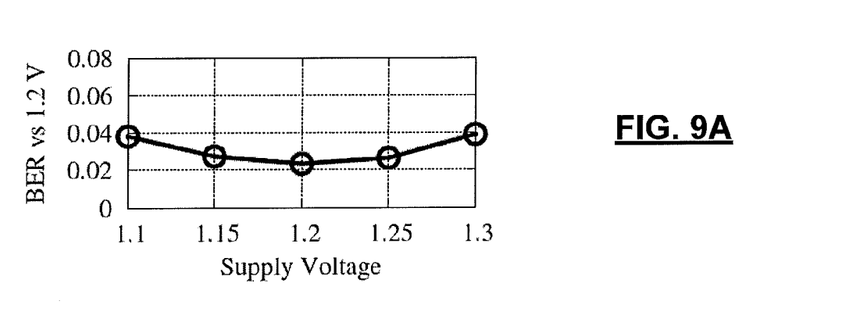
FIGS. 9A and 9B are graphs depicting bit error rate responses at different supply voltages and temperature, respectively.
Figure 9B:
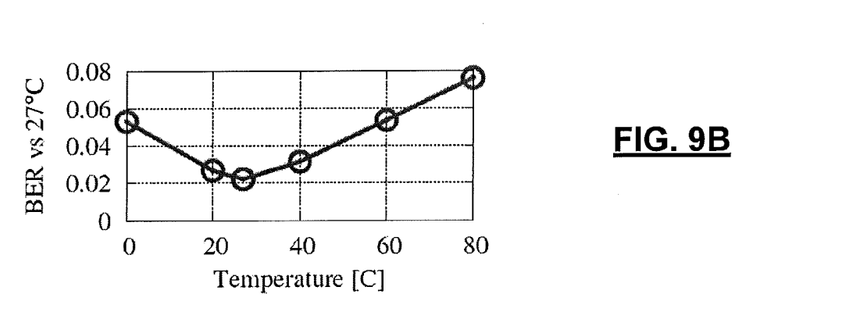

A PUF response should not be highly sensitive to changes in supply voltage or temperature, as this would restrict its useful application to tightly controlled environments. PUF responses at the nominal operating conditions of 1.2 V supply and 27° C. are compared against a variety of temperatures from 0° C. to 80° C. and supply voltages from 1.1 V to 1.3 V (FIGS. 9A and 9B). For each comparison 10,000 random PUF instances are created. For each instance, a randomly chosen unbiased challenge is applied to the PUF at both conditions; the BER is the fraction of these 10,000 trials in which the two responses differ. While changing supply voltage or temperature does increase the BER of responses, at all tested conditions the BER remains less than 0.076.

The Bitline PUF is susceptible to modeling attacks if the challenge-response pairs (CRPs) can be observed, and therefore care must be taken to avoid or obfuscate the CRPs of the Bitline PUF. Otherwise, an adversary can use a parametric model to predict the PUF response to any challenge, without needing a dictionary of all possible challenge response pairs.

A modeling attack on bitline PUFs is demonstrated using support vector machine (SVM) classification. The task of the SVM classifier is, after training on some number of observed CRPs, to correctly predict responses to new challenges. To use SVM classification, each CRP is converted to a pair (x, y)|x $\in\{0, 1\}^{4Y}$, y$\in\{-1, +1\}$ where Y is the number of rows in the PUF and the number of values in the challenge. In the pair (x, y), x represents the challenge and is determined according to Eq. 6, while y represents the response of the PUF to the challenge. Note that for SVM classification, negative responses are entered as the value −1 instead of 0.

$$x_{4i:4i+3} = \begin{cases} 1,0,0,0 & \text{if } c_i == 0 \\ 0,1,0,0 & \text{if } c_i == 1 \\ 0,0,1,0 & \text{if } c_i == 2 \\ 0,0,0,1 & \text{if } c_i == 3 \end{cases} \quad (6)$$

Figure 10:
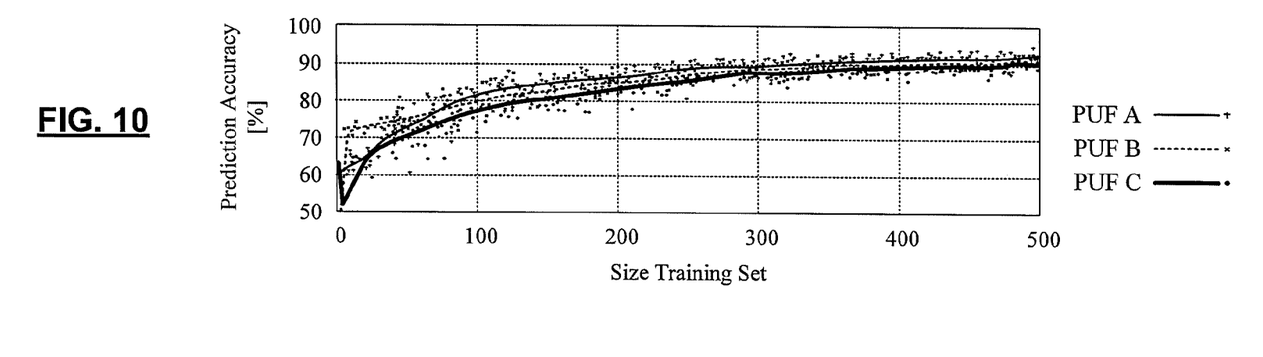
FIG. 10 is a graph showing the prediction accuracy of SVM classification as applied to three different bitline PUF instances.

FIG. 10 shows the prediction accuracy of SVM classification using the tool SVM$^{light}$, applied to three different bitline PUF instances. For each PUF instance, 1000 CRPs are collected and cross-validation is used to examine how the prediction accuracy varies with the size of the training set. After 500 CRPs are observed, responses can be predicted with approximately 90% accuracy. While for clarity only three PUFs are plotted in FIG. 10, these three results are typical of observed prediction accuracy trends for bitline PUFs.

Parametric models exist for many PUFs including the arbiter PUF. Yet, the practical usefulness of PUFs with parametric models is not diminished because modeling resistance can be assured through obfuscating or preventing access to the PUF responses. The Bitline PUF is uniquely suited to protection via access control because it uses ordinary SRAM, and as such can employ SRAM access protection mechanisms such as ARM TrustZone.

The power consumption of a bitline PUF evaluation is higher than that of a standard SRAM read operation. More specifically, a bitline PUF draws significant current during metastability when the bitline potentials are approximately equal. During metastability, all of the cells that are active in the challenge are drawing current, either through $p_1$ and $n_2$, or else through $p_2$ and $n_1$.

Figure 11A:
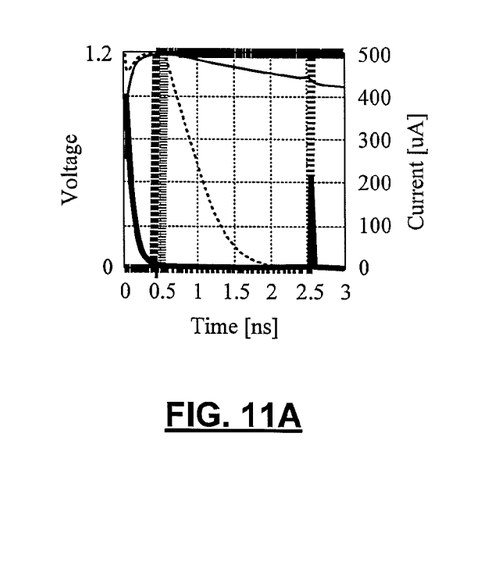
FIGS. 11A and 11B are graphs illustrating a typical SRAM read operation and a bitline PUF evaluation, respectively.
Figure 11B:
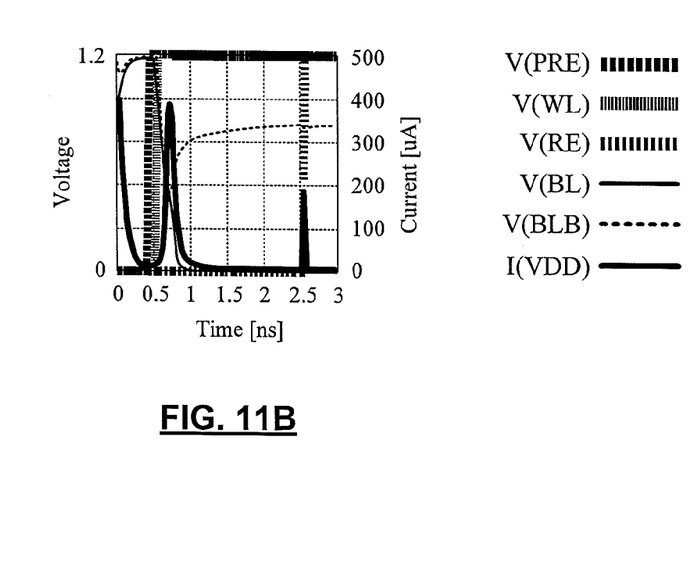
Figure 11C:
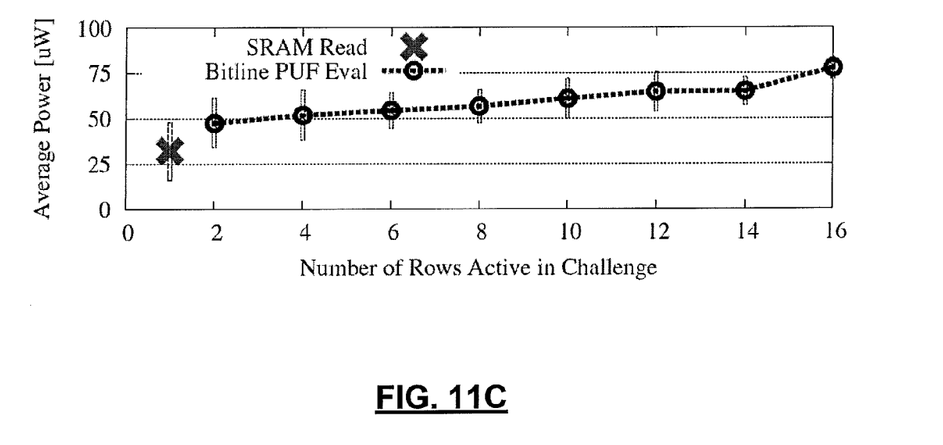
FIG. 11C is a graph showing the average power increase with the number of rows that are active in a challenge.

FIG. 11A shows a normal SRAM read operation and its current draw; the most significant instantaneous currents are consumed when the bitlines are precharged, and when the sense amplifier turns on. During a bitline PUF evaluation (FIG. 11B), an additional third current spike is observed during metastability. The power consumed by a bitline PUF evaluation depends on the size of this current spike. When more cells are active, there is a potential for larger instantaneous current and therefore higher power. FIG. 11C shows that average power increases with the number of rows that are active in a challenge.

This disclosure presents a new PUF design termed the Bitline PUF. The Bitline PUF is a low cost solution that shares most of its circuitry with SRAM, and is created by adding two logic gates and a flip-flop to the wordline driver of each SRAM row to enable challenge-response hashing. The Bitline PUF, applied to a SRAM of typical size, has a response latency of 2.6 µs and response throughput of 99.8 Mbps. Circuit simulation indicates that responses produced by the Bitline PUF in 90 nm technology have a nominal bit error rate of 0.023, and that the bit error rate does not exceed 0.076 for any supply voltage between 1.1 V and 1.3 V, or temperature between 0° C. and 80° C.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for performing a physical unclonable function using an array of static random-access memory (SRAM) cells, comprising
    arranging an array of SRAM cells in rows and columns, where SRAM cells in each row in the array share a common wordline and SRAM cells in each column in the array share common bitlines;
    issuing an authentication challenge to the array of SRAM cells by activating two or more wordlines concurrently; and
    detecting, in response to the authentication challenge, an output for each column of the array, where the outputs collectively form a response to the authentication challenge.

2. The method of claim 1 wherein issuing an authentication challenge further comprises writing values into SRAM cells and loading drivers for each wordline prior to activating the two or more wordlines.

3. The method of claim 2 further comprises loading drivers for a given wordline using a control circuit, where the control circuit includes a flip-flop circuit that operates to store the activation signal.

4. The method of claim 1 wherein detecting an output for each column further comprises detecting a differential voltage across bitlines associated with each column in the array of SRAM cells and, for each differential voltage, assigning a value to a binary number based on the differential voltage, and aggregating the values from each column in the array of SRAM cells to form the output.

5. The method of claim 4 further comprises performing an authentication function on a computing device based on the output.

6. The method of claim 1 wherein each SRAM cell includes a pair of inverters cross coupled to each other.

7. The method of claim 2 further comprises issuing a first authentication challenge to the array of SRAM cells by activating a first subset of wordlines concurrently and detecting, in response to the first authentication challenge, an output for the first authentication challenge.

8. The method of claim 7 further comprises issuing a second authentication challenge to the array of SRAM cells by activating a second subset of wordlines concurrently and detecting, in response to the second authentication challenge, an output for the second authentication challenge, where the second subset of wordlines is mutually exclusive from the first subset of wordlines.

9. A method for performing a physical unclonable function using an array of static random-access memory (SRAM) cells, comprising:

loading values in each SRAM cell in an array of SRAM cells, where the array of SRAM cells is arranged in rows and columns, the SRAM cells in each row in the array share a common wordline, and SRAM cells in each column in the array share common bitlines;

loading drivers for each wordline in the array of SRAM cells;

asserting two or more wordlines concurrently and thereby issue an authentication challenge to the array of SRAM cells;

detecting a differential voltage across bitlines associated with each column in the array of SRAM cells;

assigning, for each differential voltage, a value to a binary number based on the differential voltage; and aggregating the value of the binary number from each column in the array of SRAM cells to form an output.

10. The method of claim 9 further comprises loading drivers for a given wordline using a flip-flop circuit.

11. The method of claim 9 wherein each SRAM cell includes a pair of inverters cross coupled to each other.

12. The method of claim 9 further comprises performing an authentication function on a computing device based on the output.

* * * * *